Patented Dec. 17, 1929

1,740,212

UNITED STATES PATENT OFFICE

GEORGE C. WARREN, OF NEWTON, MASSACHUSETTS

BITUMINOUS COMPOSITION AND THE MANUFACTURE THEREOF

No Drawing.   Application filed October 3, 1924.   Serial No. 741,384.

The invention relates to a bituminous composition or mastic comprising an amalgamation of mineral matter, bituminous cement, rubber and fibrous material, and which is useful in the making of pavements, sidewalks and flooring; plastic roofing, waterproofing material and the like.

The invention forms the subject-matter of an earlier application for Letters Patent filed by me January 5, 1923, Serial No. 610,902, for which the present application is substituted as a continuance in part of the former application.

It is well known that an admixture of rubber adds greatly to the resiliency and durability of bituminous cement. An admixture of fibre also adds to the strength and durabiilty of the cement and assists it in combining together the mineral matter entering into the composition when such is employed. Both rubber and fibre, however, are ordinarily too expensive to be economically used in such connection.

By the present invention it is made economically possible and practicable to utilize both rubber and fibrous material in the manufacture of a bituminous composition or mastic, and this by obtaining the rubber and fibre from waste rubberized fabric (such as discarded rubber tires, rubber hose, rubber boots and rubber blankets) by a process coincident with the making of the composition or mastic, and which results in a bituminous composition of superior quality. It is effected as follows:—

Rubberized fabric which has first been chopped or cut into pieces is added to mineral matter such as sand, gravel, crushed or pulverized stone, slag, etc. heated to such high temperature as will soften the rubber in the rubberized material without destroying its life or that of the fibre, and the mass is violently agitated. The rubberized fabric is preferably first cut into pieces not more than ½ of an inch in any dimension, although it is obvious that in any effort to chop or cut the fabric into any approximate size some pieces will be considerably smaller and other pieces considerably larger than said size. Any desired weight of the rubberized material thus prepared is added to any desired weight of the mineral matter. The agitation is accomplished in a mechanical mixer of any convenient form or type.

As the rubber becomes softened by the heat the attritive influence of the mineral matter induced by the agitation of the mass will tend to break up that portion of the rubber that is vulcanized and free such unvulcanized rubber as there may be in the mass. At the same time the fibrous material will be shredded to a large extent into its component rubberized threads.

After the agitation has been carried on for a short time hot bituminous cement is then added to the mass, kept agitated, and the agitation continued. The effect upon the rubberized fabric in inducing further disintegration thereof will be continued as before and the rubber will become initimately combined with the plastic bituminous material, the vulcanized particles mixing therewith and the unvulcanized rubber otherwise combining therewith, both imparting elasticity. At the same time the released threads of fibrous material will become intimately mixed throughout the mass reinforcing the bituminous material, and acting as a cementing medium for the mineral particles by giving the mass toughness and pliability and assisting in binding together the mineral particles.

The preliminary agitation of the mineral matter and rubberized fabric is not carried on for any specific period of time. In practice it is found that an agitation of ½ to 3 minutes is sufficient, for it is not essential that the disintegration of the rubberized fabric be completed during this phase of the operation, but may be continued and completed after the bituminous cement has been added to the mass. In fact, the bituminous cement might be added at the beginning of the operation but preferably not. When the bituminous cement is added after the preliminary agitation of the mineral matter and rubberized fabric the continued agitation of the mass is carried on for no definite time, but in practice it is found that an agitation of from 1 to 3 minutes is sufficient to effect the desired result.

Regarding the heat employed, the process is not limited to any specific temperature provided it is such as will soften the rubber without destroying its elasticity, the life of the fibre, or the plasticity of the cement.

In practice the rubberized fabric is preferably added while at air temperature to the mineral aggregate heated to a temperature of from 250 to 400 degrees F. and the bituminous cement is generally added when at a temperature of about 250 to 350 degrees F., but if the bituminous material is sufficiently fluid at atmospheric temperature it need not be heated.

It is obvious that the composition is not limited to any special proportion of ingredients or sizes of mineral particles inasmuch as these will vary greatly with the purpose for which the composition is designed. It is preferred that the finished product shall be in proportions for various purposes as follows:—

Bituminous cement_____ 5 to 20 per cent
Shredded rubberized fabric. 5 to 30 per cent
Mineral aggregate_____ 90 to 50 per cent Anyone skilled in the art of paving, roofing or waterproofing can readily determine the best proportions of ingredients for use in any specific structure.

The composition is very efficient in point of wearing quality, toughness and elasticity, and this is essentially due to the fact that the cementing medium for the mineral particles comprises the amalgamation of bituminous cement with rubberized fibrous material, the shredded rubberized fabric assisting in the binding together of the mineral particles. The composition is also such as permits of the practical use of vegetable fibre in a bituminous composition where the composition is subjected to such uses or conditions of use that surface exposure of the fibre has hitherto resulted in a disintegration or rotting thereof leaving objectionable pits or openings in the surface structure.

One use for the composition is in connection with the surfacing of pavements or roadways. When used for this purpose it is applied and rolled in precisely the same manner as any top surfacing composition. Owing to the fibrous nature of the composition, when used in such connection it bonds especially well with the base on which it is laid.

As used herein the term "rubber" is meant to include any of the rubber compounds used in the arts in place of pure rubber.

Having thus fully described my invention, I claim and desire to secure by Letters Patent of the United States:—

1. The process of making a bituminous composition which comprises agitating a mass of mineral matter, rubberized fabric reduced into pieces, and bituminous cement at a temperature sufficient to soften the rubber.

2. The process of making a bituminous composition which comprises agitating a mass of mineral matter, rubberized fabric reduced into pieces and bituminous cement at a temperature sufficient to soften the rubber, continuing the agitation in a manner to effect disintegration of the rubberized fabric and its distribution throughout the mass.

3. The process of making a bituminous composition which comprises combining rubberized fabric reduced into pieces, mineral matter and bituminous cement in the presence of heat sufficient to soften the rubber without destroying its elasticity or the life of the fibre and violently agitating the hot mass in a manner sufficient to effect a disintegration of the rubberized fabric and its distribution throughout the mass.

4. In the process of making a bituminous composition containing mineral matter, bituminous cement, rubber and fibrous material, the step of disintegrating rubberized fabric by combining it with mineral matter and agitating the mass in the presence of heat.

5. In the process of making a bituminous composition containing mineral matter, bituminous cement, rubber and fibrous material, the step of disintegrating rubberized fabric by combining it with mineral matter and agitating the mass in the presence of heat sufficient to soften the rubber.

6. In the process of making a bituminous composition containing mineral matter, bituminous cement and disintegrated fabric material, the step of disintegrating fabric material by combining it with mineral matter and agitating the mass.

7. The process of making a bituminous composition which comprises adding rubberized fabric cut into pieces to mineral matter, agitating the mass in the presence of heat sufficient to soften the rubber, afterwards adding bituminous cement to the mass and continuing the agitation.

8. The process of making a bituminous composition which comprises the addition of rubberized fabric cut into pieces to heated mineral matter, agitating the mass, then adding bituminous cement and continuing the agitation.

9. The process of making a bituminous composition which comprises the addition of rubberized fabric cut into pieces to heated mineral matter, agitating the mass to effect disintegration of the rubberized fabric and its distribution throughout the mass, then adding bituminous cement and continuing the agitation for effecting a thorough mixing of the components forming the mass.

GEORGE C. WARREN.